US008583415B2

(12) United States Patent
Krishnan S et al.

(10) Patent No.: US 8,583,415 B2
(45) Date of Patent: Nov. 12, 2013

(54) PHONETIC SEARCH USING NORMALIZED STRING

(75) Inventors: Hari Krishnan S, Hyderabad (IN);
Perraju Bendapudi, Hyderabad (IN);
Archishmat Sharad Gore, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 1359 days.

(21) Appl. No.: 11/771,542

(22) Filed: Jun. 29, 2007

(65) Prior Publication Data

US 2009/0006075 A1    Jan. 1, 2009

(51) Int. Cl.
*G06F 17/28* (2006.01)
(52) U.S. Cl.
USPC ........................................................ 704/2
(58) Field of Classification Search
USPC ........................................................ 704/2
See application file for complete search history.

(56) References Cited

U.S. PATENT DOCUMENTS

| 5,758,314 | A |   | 5/1998  | McKenna           |
|-----------|---|---|---------|-------------------|
| 6,026,398 | A |   | 2/2000  | Brown             |
| 6,115,686 | A | * | 9/2000  | Chung et al. ........... 704/260 |
| 6,466,907 | B1|   | 10/2002 | Ferrieux           |
| 6,868,380 | B2|   | 3/2005  | Kroeker            |
| 6,976,019 | B2|   | 12/2005 | Davallou           |
| 7,010,487 | B1|   | 3/2006  | Choi               |
| 7,076,423 | B2|   | 7/2006  | Boehme             |
| 7,299,452 | B1| * | 11/2007 | Zhang et al. ........... 717/124 |
| 7,865,358 | B2| * | 1/2011  | Green et al. ........... 704/10 |

| 2003/0195741 | A1 | * | 10/2003 | Mani et al. .................. 704/8 |
| 2004/0024760 | A1 |   | 2/2004  | Toner |
| 2005/0060138 | A1 | * | 3/2005  | Wang et al. .................. 704/1 |
| 2005/0195171 | A1 | * | 9/2005  | Aoki et al. .................. 345/172 |
| 2006/0031207 | A1 |   | 2/2006  | Bjarnestam |
| 2006/0112091 | A1 | * | 5/2006  | Chapman et al. ........... 707/4 |
| 2006/0206324 | A1 | * | 9/2006  | Skilling et al. ............ 704/231 |
| 2007/0250494 | A1 | * | 10/2007 | Peoples et al. ............. 707/4 |
| 2008/0167856 | A1 | * | 7/2008  | Janakiraman et al. ...... 704/9 |
| 2008/0270111 | A1 | * | 10/2008 | Hanumanthappa ......... 704/3 |

FOREIGN PATENT DOCUMENTS

| EP | 420825 A2 | 4/1991 |
| WO | WO0070603 A1 | 11/2000 |
| WO | WO0165416 A2 | 9/2001 |

OTHER PUBLICATIONS

T.N. Gadd, "PHONIX: The Algorithm," ISSN 0033-0337, 1990, vol. 24, n. 4, Emerald, Bradford, Royaume-Uni, 2006 INIST-CNRS, 1 page.

(Continued)

*Primary Examiner* — Jakieda Jackson
(74) *Attorney, Agent, or Firm* — Shook, Hardy & Bacon L.L.P.

(57) ABSTRACT

A method and system for generating a normalized string and performing a phonetic search are provided. To normalize a string, a native string is obtained. Upon obtaining a native string, native-character sets within the native string are identified. Each native-character set is associated with a phonetically corresponding normalized character-set. A normalized string is generated based on the phonetically corresponding normalized character-sets. After normalizing a query string and one or more search content strings, the normalized strings may be utilized to perform a phonetic search. As such, the query string may be compared to the one or more search content strings to ascertain relevant search results. Relevant search results may be indexed and obtained at a later instant.

20 Claims, 6 Drawing Sheets

(56) References Cited

OTHER PUBLICATIONS

Justin Zobel et al., "Phonetic String Matching: Lessons From Information Retrieval," Zurich, Switzerland 1996, ACM, pp. 166-172.

S.P. Kishore et al., "A Data-Driven Synthesis Approach for Indian Languages Using Syllable as Basic Unit," Language Technologies Research Center, Hyderabad, India, Punjab Engineering College, Chandigarh, India, 7 pages, 2002.

"Double Metaphone," http://en.wikipedia.org/wiki/Double_Metaphone, Sep. 27, 2007, 2 pages.

"Soundex," http://en.wikipedia.org/wiki/Soundex, May 17, 2007, 3 pages.

* cited by examiner

| Native Character-Set | Normalized Character-Set | Rules |
|---|---|---|
| A\|AA\|a\|aa | A | All letters for the "a" family is collapsed into single capital letter A. |
| ba\|bha | B | |
| ka\|kha\|ca\|cha | C | |
| da\|dha | D | |
| i\|ii\|e\|ee\|ai\|y\|yai\|I\|II\|E\|EE\|AI\|Y\|YAI | Y | |
| pa\|pha | P | |
| ga\|gha\|GY\|g\|G | G | |
| ha\|Hi\|h | H | Please note that this Rule is used only if an "Ha" or "HI" or "h" is found in the beginning of the word. |
| ha\|h\|H | Remove the char from the String. | |
| ja\|jha | J | |
| l\|L | L | |
| m\|aM | M | |
| N\|n | N | |
| r\|RRi\|R^i\|RRI\|R^I | R | |
| u\|uu\|o\|oo\|au\|w\|O\|U\|OO\|UU\|AU | O | |
| sh\|Sh\|s | S | |
| T\|Th\|t\|th | T | |
| ~N\|~n | Z | |
| kSh\|x | X | |

FIG. 3.

PHONETIC SEARCH USING NORMALIZED STRING

CROSS-REFERENCE TO RELATED APPLICATIONS

Not applicable.

STATEMENT REGARDING FEDERALLY SPONSORED RESEARCH OR DEVELOPMENT

Not applicable.

SUMMARY

Embodiments of the present invention provide a system, method and media for, among other things, generating a normalized string and performing a phonetic search. Some of these embodiments permit an effective search even where the query or the search content includes a spelling error. These embodiments normalize strings, including query strings and search content strings, based on a phonetic representation so that normalized strings may be compared in a standard form. As a result, search results are more accurate. In addition, the search results may be indexed such that the search results may be obtained at a later instance.

This summary is provided to introduce a selection of concepts in a simplified form that is further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

Illustrative embodiments of the present invention are described in detail below with reference to the attached drawing figures, which are incorporated by reference herein and wherein:

FIG. 3 is a chart of native-character sets and corresponding normalized character-sets, according to an embodiment of the present invention;

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

Figure 1:
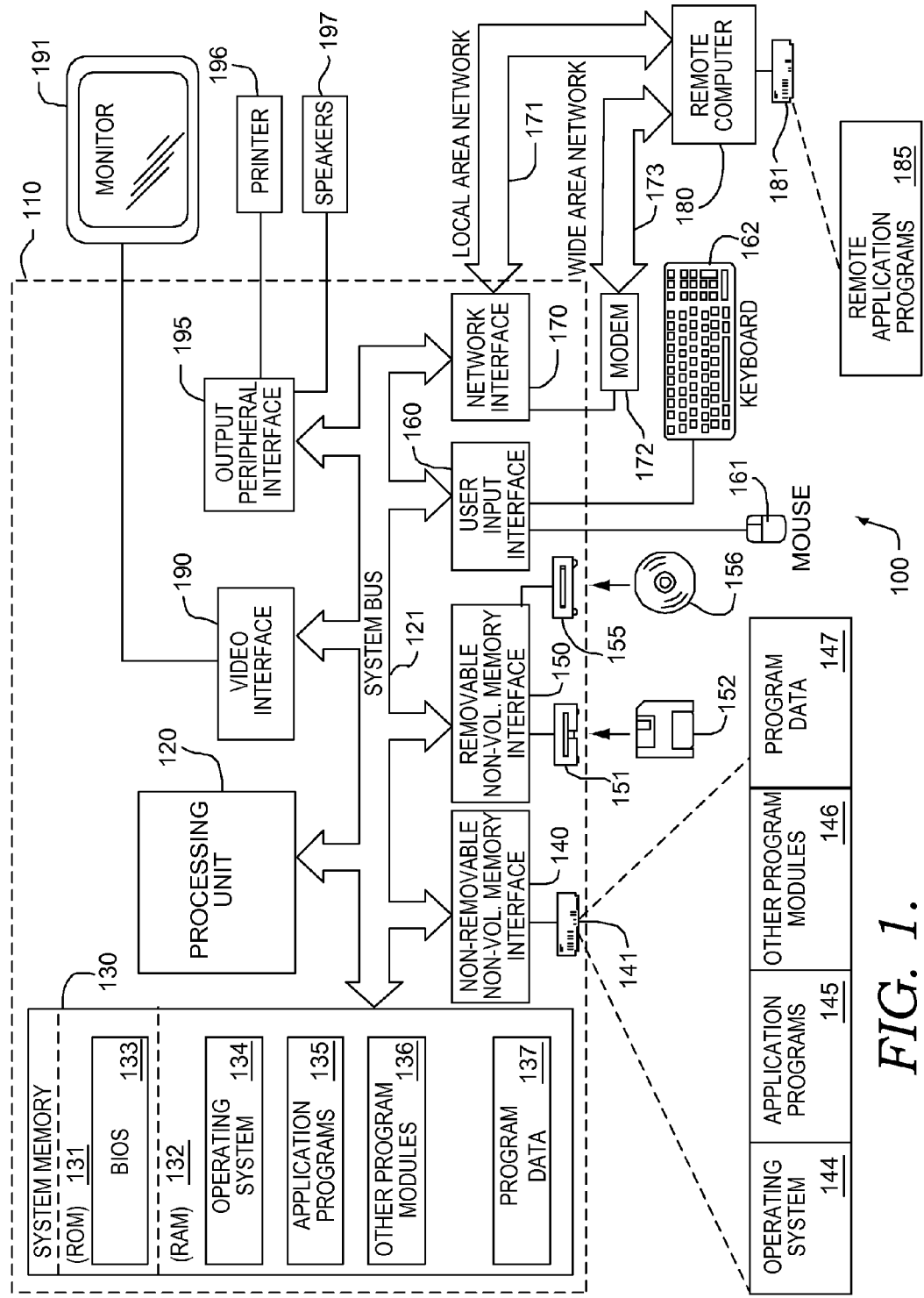
FIG. 1 is a diagrammatic view of a computing system environment on which an embodiment of the present invention may be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disc storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
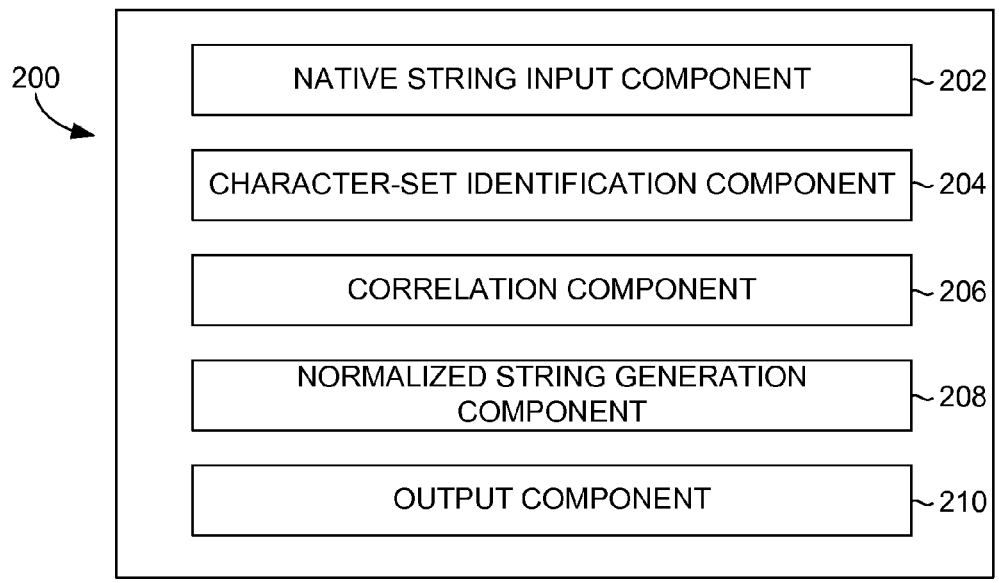
FIG. 2 is a block diagram of a restatement system, according to an embodiment of the present invention.

FIG. 2 is a block diagram of a restatement system 200 according to an embodiment of the present invention. The restatement system 200 may be utilized to generate a normalized string based on a native string. As used herein, the term "string" refers to one or more consecutive characters, such as numeric values, letters, symbols, punctuation marks, any other character associated with a writing system, or a combination thereof. A "native string," as used herein, refers to a string in its original form for which a normalized string is generated. As used herein, the phrase "normalized string" refers to a string that represents a native string. For example, a native string may be converted to a normalized string based on an algorithm and, thereby, represent the native string. In one embodiment, the normalized string may phonetically represent the native string. Such a phonetic representation may include the representation of native string consonant and/or vowel characters. Accordingly, phonetic, as used herein, may include the pronunciation of vowels as part of the normalization process.

The native string, the normalized string, or a combination thereof may be associated with a writing system, such as English or any other writing system. In an embodiment, the writing system associated with the native string is a different writing system than the writing system associated with the normalized string. For example, a native string may be based on the Indian writing system, and a normalized string may be based on an English writing system, e.g., standard twenty-six letter alphabet. As such, the restatement system 200 would generate the English-based normalized string based on the Indian-based native string. The Indian writing system may include, for example, Devanāgarī, which is used to write, at least in part, a plurality of Indian languages including Sanskrit, Hindi, Marathi, Sindhi, Bihari, Bhili, Marwari, Konkani, Bhojpuri, languages from Nepal like Nepali, Tharu Nepal Bhasa and sometimes Kashmiri and Romani.

Referring to FIG. 2, the restatement system 200 includes a native string input component 202, a character-set identification component 204, a correlation component 206, a normalized string generation component 208, and an output component 210. In some embodiments, one or more of the illustrated components may be implemented as one or more stand-alone applications. In other embodiments, one or more of the illustrated components may be integrated directly into an operating system or an application of a server and/or an end-user device. It will be understood by those of ordinary skill in the art that the components illustrated in FIG. 2 are exemplary in nature and in number and should not be construed as limited. Any number of components may be employed to achieve the desired functionality within the scope of embodiments hereof. Further, components may be located on any number of servers or computing devices.

The native string input component 202 is configured to obtain one or more native strings. The native string input component 202 may obtain a native string by receiving, retrieving, or determining such a native string. In one embodiment, the native strings obtained by native string input component 202 may comprise at least a portion of a query, search content, feed, any other data, or a combination thereof. A query may refer to a query provided by a user or provided by a computer program requesting information. In an embodiment where at least a portion of a native string is provided by a user, a graphical user interface may be utilized to obtain the native string. The user interface may be associated with any search mechanism, such as, for example, a contact list, a unified communications client, e.g., Microsoft® Office Communicator 2007, a media player, a web page, a document, a desktop, a dictionary function, or any other search mechanism. In using the graphical user interface, the user may type, paste, select, and/or enter (such as by speaking) one or more characters, i.e., a native string, into an input field. The graphical user interface may include one of more functional aspects, such as pull down menus, text fields, checkboxes, fields within an application domain, speech-to-text, and the like. Where speech-to-text functionality exists, the native string input component 202 may be adapted to receive speech input and to digitize such input into text.

Search content, as used herein, may refer to any content that may be searched including, but not limited to, any data associated with a contact list, a unified communications client, e.g., Microsoft® Office Communicator 2007, a media player, a web page, a document, a desktop, a dictionary function, news aggregators, or any other searchable content. Such search content may be stored, for example, in a database, computer memory, or the like. Alternatively, the search content may be accessible such that a native string may be obtained even though the search content is not locally or remotely stored. In one instance, a native string obtained from search content may be associated with a query provided by a user or computer program.

In some embodiments, the native string input component 202 may also be configured to determine whether to obtain an input string. For example, in some embodiments, a normalization string may only be desired for specific native strings. In such an embodiment, the native string input component 202 may select only to obtain the desired native strings. A desired native string may include, for example, a native string comprising a proper noun, i.e., a noun identifying a person, place, thing, or event; a native string for which a normalized string has not been previously generated; and the like.

The character-set identification component 204 is configured to identify one or more character-sets within a native string, i.e., native character-sets. A character-set refers to a group of one or more characters positioned adjacent to one another. As such, a native string may include one or more character-sets. In one embodiment, native character-sets within a native string may be identified based on a group of predetermined native character-sets. Such a group of predetermined native character sets may be based on a specific writing system, such as Indian. By way of example only, native character-sets within a group may be predetermined based on, for example, one or more characters that, when combined, have a phonetic equivalent associated with another writing system. Such a phonetic equivalent includes an equivalent for consonants, vowels, or a combination thereof. Native character-sets within a native string may then be identified by referring to the group of predetermined native character sets to find a matching native character-set.

In one embodiment, the character-set identification component 204 may systematically identify native character-sets within a native string. As such, character-set identification component 204 may identify character-sets utilizing a directional system, an optimization system, or a combination thereof. A directional system refers to the procedural direction for identifying native character-sets, such as from left-to-right, right-to-left, beginning-to-end, end-to-beginning, and the like. By way of example only, in an embodiment utilizing a beginning-to-end directional system, the character-set identification component 204 may identify an initial native character-set that includes at least the first character of the native string. If any subsequent native character-sets follow the initial native character-set, the subsequent native character-sets are also identified by character-set identification component 204. Each such subsequent native character set may include at least the first character following the previous native character-set.

An optimization system refers to identifying native character-sets based on an optimized attribute. An optimized attribute may include, for example, the largest character-set size, the smallest character-set size, character-sets including a vowel, character-sets including a consonant, character-sets including a letter, and the like. As used herein, the phrase "character-set size" refers to the number of characters within a character-set, e.g., the character-set size of the character-set "bha" is three. By way of example only, in an embodiment utilizing a largest character-set size optimization system, the character-set identification component 204 may identify the one or more largest character-sets within the native string. In such an embodiment, the character-set identification component 204 may continue identifying native character-sets proceeding from the largest character-set size to the smallest character-set size until each native character-set of the native string is identified.

In some embodiments, the character-set identification component 204 may identify native character-sets within a native string based on a combination of a directional and optimization system. By way of example only, assume the group of predetermined native character-sets 320 of FIG. 3 is utilized to identify native character-sets within a native string. Further assume that an embodiment uses a beginning-to-end directional system in combination with a largest character-set size optimization system to identify native character sets within the native string, "Moorthi," obtained by native string input component 202. In such a case, the character-set identification component 204 may begin by identifying the initial character-set, i.e., the character set including at least the first character of the native string, having the largest character-set size. Because the predetermined native character-sets 322 associated with the initial character m include only m and aM, and do not include mo, the largest character-set including at least the first character of the native string is m. Upon determining the largest initial native character-set of the native string, the character-set identification component 204 may identify each of the largest subsequent character-sets, if any. As such, the first character following the initial native character set within the native string is o. Because the predetermined native character-sets 326 associated with the character o includes the native character-set oo, the largest subsequent native character-set of the native string is oo. Thereafter, the first subsequent character following the oo character-set is an r. Because an rt character-set does not exist among the predetermined native character-sets 324 associated with the character r, the largest subsequent character-set of the native string is r. The subsequent characters of the native string following the r character-set are t, h, and i. Because the largest subsequent native character-set 328 associated with the letter t is th, the next native character-set of the native string is th. The final character of the native string is i. As such, the final native character-set of the native string is i. Accordingly, the native character-sets for the native string "moorthi," based on the group of predetermined native character-sets 320, includes m, oo, r, th, and i.

The correlation component 206 is configured to associate a native character-set identified by character-set identification component 204 with a corresponding normalized character-set. A normalized character-set refers to one or more characters that represent a native character-set. As such, a normalized character-set may, for example, phonetically represent a native character-set. In one embodiment, normalized character-sets may be based on a specific writing system, e.g., English. Such normalized character-sets may be predetermined. By way of example only, normalized character-sets may be predetermined based on, for example, a phonetic equivalent, including consonants and vowels, to one or more combined characters associated with another writing system.

The correlation component 206 may operate via an algorithm, a restatement chart, such as the restatement chart 300 of FIG. 3, or a combination thereof. In an embodiment utilizing a restatement chart to correlate a native character-set with a corresponding normalized character-set, the restatement chart may include a group of native character-sets and a group of normalized character-sets. Such an embodiment may further include a group of rules that correspond with a native character-set, a normalized character-set, or a combination thereof. A rule may be utilized to correlate a native character-set identified by character-set identification component 204 with a corresponding normalized character-set.

In one embodiment, a restatement chart may be modified based on a specific user. The restatement chart may be modified automatically or upon a user selected preference. Where a restatement chart is modified automatically, the modification may be based on an algorithm that interprets phonetic deviations between the correct characters within a string, e.g., the correct spelling of a word, and the characters input or selected by the user. Where a restatement chart is modified upon a user selected preference, in one instance, the user may select to modify the restatement chart based on an algorithm that interprets phonetic deviations of one or more correct character strings that differ from the characters input or selected by the user. In another instance, a restatement chart may be modified upon a user providing feedback and/or setting forth character errors. The user feedback may include, for example, suggestions, recommendations, desired restatement chart modifications, required restatement chart modifications, and the like.

Referring to FIG. 3, an exemplary restatement chart 300 that may be utilized by correlation component 206 is shown, according to one embodiment of the present invention. The restatement chart 300 includes a group of predetermined native character-sets 320 based on the Indian writing system, a group of normalized character-sets 330 based on the English writing system, and a group of rules 340. In one embodiment, one or more native character-sets may correspond to a normalized character-set and/or a rule. For example, in FIG. 3, predetermined native character-sets 321 correspond to normalized character-set 331 and rule 341.

By way of example only, assume that the native string "Moorthi" is input by a user and, thereafter, is obtained by native string input component 202. Further assume that character-set identification component 204 identified the native character sets m, oo, r, th, and i, respectively, for the native string. Utilizing the restatement chart 300 of FIG. 3 as a lookup system, the correlation component 206 may associate the identified native character-sets with corresponding normalized character-sets such that a normalized string may be generated. As such, for each of the native character-sets, the corresponding normalized character-set is identified. For example, for each native character-set 320, including the identified native character-set m, the corresponding normalized character-set equals M. The correlation component 206 may further determine that for native character-sets oo, r, th, and i, the corresponding normalized character sets respectively equal O, R, T, and Y.

It will be understood by those of ordinary skill in the art that the native character-sets, normalized character-sets, and rules illustrated in FIG. 3 are exemplary in nature and in number and should not be construed as limited. One skilled in the art will recognize that other embodiments for the restatement chart 300 may exist. For example, each native character-set may be listed independently, rather than grouping native character-sets having a common corresponding normalized character-set, and the corresponding normalized character-set may be listed adjacent to each independent native character-set listing.

Referring again to FIG. 2, a normalized string generation component 208 is configured to generate a normalized string based on the one or more normalized character-sets identified by correlation component 206. In one embodiment, to generate a normalized string, the one or more normalized character-sets are positioned such that each normalized character-set conforms with the position of the corresponding native character-set. The normalized string generation component 208 may utilize conversion, transformation, substitution, formation, and the like to generate the normalized string. In an embodiment where substitution is used to generate a normalized string, each native character-set of a native string may be substituted for the corresponding normalized character-set. In some embodiments where conversion, transformation, or substitution is used, the normalized string generation component 208 may only convert, transform, or substitute native character sets that differ from the corresponding normalized character-set identified by correlation component 206.

By way of example only, assume the native character-sets of the native string "Moorthi" include m, oo, r, th, and i. Further assume the corresponding normalized character-sets associated with each of the native character-sets include M, O, R, T, and Y, respectively. In an embodiment where the native character-sets are replaced, upon replacing the native character-sets with the corresponding normalized character-sets, the native string "moorthi" is converted to the normalized string "MORTY." In an embodiment where the normalized strings are originated, rather than converted from the native string, the normalized string "MORTY" is formed.

An output component 210 is configured to output the normalized string generated by the normalized string generation component 208. In some instances, the normalized string may be output to a user for display, such as, via a computer monitor or printer. In other instances, the normalized string may be output to another component or module operating on a computing device, such as a server or end-user device.

Figure 4:
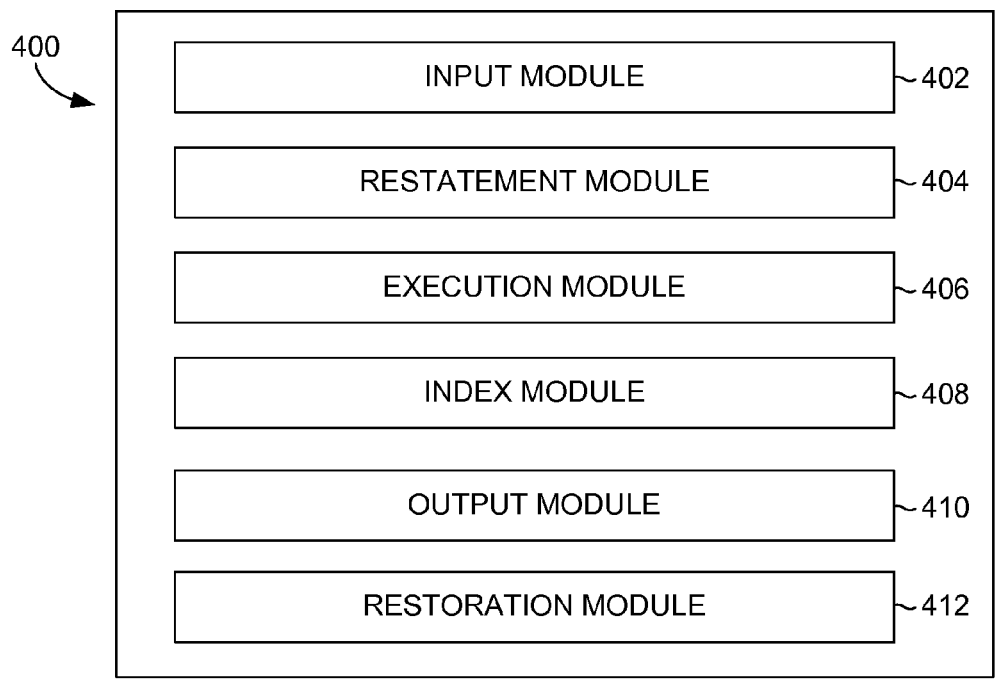
FIG. 4 is a block diagram of a phonetic searching system, according to an embodiment of the present invention.

FIG. 4 is a block diagram of a phonetic searching system 400 according to an embodiment of the present invention. Such a phonetic searching system 400 may be utilized to overcome spelling errors such that desired content may be located notwithstanding the error. For example, in one embodiment, phonetic searching system 400 may be used to locate strings within search content that correspond to the string entered by a user even in cases where the string characters entered by a user do not precisely match the string characters set forth within the search content.

The phonetic searching system 400 includes an input module 402, a restatement module 404, an execution module 406, an index module 408, an output module 410, and a restoration module 412. In some embodiments, one or more of the illustrated modules may be implemented as one or more stand-alone applications. In other embodiments, one or more of the illustrated modules may be integrated directly into an operating system or an application of a server and/or an end-user device. It will be understood by those of ordinary skill in the art that the modules illustrated in FIG. 4 are exemplary in nature and in number and should not be construed as limited. Any number of modules may be employed to achieve the desired functionality within the scope of embodiments hereof. Further, modules may be located on any number of servers or computing devices.

The input module 402 may be configured to obtain any data associated with a search. The input module 402 may obtain data by receiving, retrieving, or determining such search-related data. In one embodiment, the input module 402 may be configured to obtain native strings, other search-related data, or a combination thereof. For example, the input module 402 may obtain a native string associated with a user query as well as search content that may be searched. Native strings obtained by the input module 402 may comprise at least a portion of a query, search content, any other data, or a combination thereof. Other search-related data obtained by input module 402 may include at least a portion of a query, search content, any other data, or a combination thereof. Such queries, search content, and the like may include native strings associated therewith.

The data obtained by input module 402 may be associated with a contact list, a unified communications client, e.g., Microsoft® Office Communicator 2007, a media player, a web page, a document, a desktop, a dictionary, a news aggregator, or any other application having searchable content. Such data may be stored, for example, in a database, computer memory, or the like. Alternatively, the data may be accessible such that input module 402 may obtain the data even though the data is not stored locally or remotely.

In some embodiments, the input module 402 may also be configured to determine whether to obtain native strings, other search-related data, and the like. Input module 402 may determine whether to obtain native strings based on a program feature or user indication. Program features may include, for example, a phonetic search option and a rolling option. The phonetic search option allows the phonetic search feature to be utilized when the phonetic search option is activated and restricts the phonetic search feature when the phonetic search option is not activated. In some embodiments, a user may indicate a desire to utilize the phonetic search or, conversely, turn off the phonetic search option. In other embodiments, the phonetic search option may be manipulated by an algorithm, a program developer, or a program administrator.

An activated rolling option allows a native string to be obtained, normalized, searched for, and/or output as the native string is entered. For example, upon entering only a portion of a native string into a query field, the rolling option may normalize the portion obtained, search content for the normalized portion, and output the search results. As such, the search results may change as more characters of the native string are obtained. In some embodiments, a user may indicate a desire to activate or deactivate the rolling option. In other embodiments, the rolling option may be manipulated by an algorithm, a program developer, or a program administrator.

In an embodiment where the input module 402 determines whether to obtain native strings based on a user indication, a user may indicate a desire to perform a search or may specify search content. For example, in an embodiment where the phonetic search option is deactivated or does not exist, a user may indicate a desire to perform a search based on the native string entered by the user. Such an indication may include the selection of a "submit" or "search" icon. Some embodiments provide the user with a selection of search content so that the user may receive search results focused on the user's desires. For example, a user may be presented with the option to search all news articles, sports articles, blogs, and the like. Upon such an indication to perform a search, the input module 402 may obtain the respective content, such as a native string associated with the user query or search content related to data desired by the user.

The restatement module 404 is configured to generate a normalized string based on a native string. The restatement module 404 may generate a normalized string utilizing conversion, transformation, substitution, formation, and the like. In one embodiment, the restatement module 404 may comprise the restatement system 200 of FIG. 2. As previously mentioned, such a restatement system 200 of FIG. 2 may include a native string input component 202, a character-set identification component 204, a correlation component 206, a normalized string generation component 208, and an output component 210.

In one embodiment, the input module 402 of FIG. 4 may obtain queries and search content while the native string input component 202 of FIG. 2 may obtain native strings set forth within the queries and search content obtained by input module 402. For example, the input module 402 may obtain a news article to be searched, and the native string input component 202 may obtain native strings set forth in the news article. In some embodiments, each string set forth within a query and/or search content obtained by input module 402 may also be obtained by native string input component 202. For example, assuming a blog having 100 native strings is obtained by input module 402, the native string input component 202 of the restatement module may obtain each of the 100 native strings and may, thereafter, normalize each of the 100 native strings.

In other embodiments, native string input component 202 may only obtain specific native strings set forth in search content obtained by input module 402. For example, assuming a blog having 100 native strings is obtained by input module 402, the native string input component 202 of the restatement module may only obtain, for example, the native strings associated with a pronoun or the native strings similar to a query entered by a user. One skilled in the art will recognize that the functionality of the input module 402 of FIG. 4 and the native string input component 202 of FIG. 2 may overlap, in part or in entirety. A plurality of embodiments may exist to carry out the desired functionality.

Notwithstanding the manner of obtaining native strings, the restatement module 404 may generate a normalized string for each native string obtained by input module 402, native string input component 202, or a combination thereof. As such, restatement module 404 may be utilized to normalize a native string associated with a query, to normalize a native string associated with search content, and the like.

The execution module 406 is configured to execute a search. The search content to be searched may be obtained by input module 402 or native string input component 202. Alternatively, the search content to be search may be accessed and, thereafter, searched. For example, rather than obtaining a website, execution module 406 may access the website and search the content.

In an embodiment where a normalized string is generated based on a native string associated with a query, search content may be searched based on the query normalized string. For example, to search the search content based on the query normalized string, normalized strings may be generated for both a native string associated with a query and one or more native strings associated with search content. The normalized strings associated with search content may be generated for each native string within the search content or for specific native strings within the search content. Such specific native strings within the search content may include, for example, strings similar to the query native string, strings associated with proper nouns, strings within the full-text of the search content, or strings within the metadata of the search content. In an embodiment where normalized strings are generated for both a native string associated with a query and one or more native strings associated with search content, the search content having one or more normalized strings may be searched to find one or more normalized strings that match the normalized string associated with the query.

Search content may also be searched based on variants of the query string. A variant may include alternative spellings that result in an identical normalized string. By way of example only, "moorthy" and "moorthi" both result in a normalized string comprising "MORTY." In such a case, upon normalizing a native string, each variant spelling that may result in an identical normalized string may be determined. Such variants may be determined by utilizing an algorithm or a restatement chart, such as restatement chart 300 of FIG. 3. Alternatively, variants previously determined may be stored within an index, database, or memory so that variants may be determined by identifying the variants previously captured.

The execution module 406 may also be configured to determine search content to search. In one embodiment, a user may indicate the desired search content. For example, with respect to a news aggregator, a user may indicate the news feeds of interest, such as blogs, all news, or specific feeds, e.g., MSN® Entertainment. A user may also indicate the news locations of interest, e.g., Baghdad, Beijing, New York, and the like.

The index module 408 is configured to index native strings, normalized strings generated by the restatement module 404, or a combination thereof. Index module 408 allows a later query to utilize the search content previously ascertained. Index module 408 may index strings using any method, such as alphabetizing the strings, associating each string with an identifier, and the like.

In one embodiment, index module 408 indexes normalized strings and associates the normalized strings with search content having the normalized string or a variant thereof. In such an embodiment, the associated search content having the normalized string, or variant thereof, may also be indexed. Accordingly, the next time a search is desired based on an indexed normalized string, the index is utilized to quickly ascertain the search content having the normalized string or variants thereof.

The index module 408 may also be configured to store the normalized search terms, or variants thereof, and/or associated search content. In some embodiments, the normalized search terms, or variants thereof, the associated search content, or a combination thereof may be stored on the local machine. For example, a user may enter a native string into a query field. Upon normalizing the native string and locating the normalized string within search content, the relevant feed and content thereof may be indexed on the local machine.

The output module 410 is configured to output one or more normalized strings, or variants thereof, execution results, or a combination thereof. In some instances, the normalized string and/or execution results may be output to a user, such as, via a computer monitor or printer. In such an instance, the user may view the normalized string and variants thereof to verify the accuracy of the query or search results. The user may also peruse the search results to find desired search content associated with the user query. In other instances, the normalized string, execution results, or a combination thereof may be output to another component or module operating on a computing device, such as a server or end-user device. In such an instance, the normalized string and/or execution results may be output to, for example, index module 408.

The restoration module 412 is configured to utilize the index to obtain search content associated with a normalized string, native string, or combination thereof. The restoration module 412 allows a later query having a previously indexed string to utilize the search content previously located. For example, assume that at a first instance the query normalized string "MORTY" is searched for within all newspaper articles. Upon normalizing strings associated with the newspaper articles, the query normalized string "MORTY" is matched with five articles having the normalized string "MORTY." As such, the normalized string "MORTY" is indexed and associated with the five matched articles. Further assume that at a second instance a user enters or selects the native string "moorthi," and the normalized string "MORTY" is generated or retrieved based on the query native string. Rather than searching all newspaper articles again to match the normalized strings, restoration module 412 utilizes the index to quickly ascertain the normalized string, and variants thereof, and the five associated newspaper articles.

Figure 5:
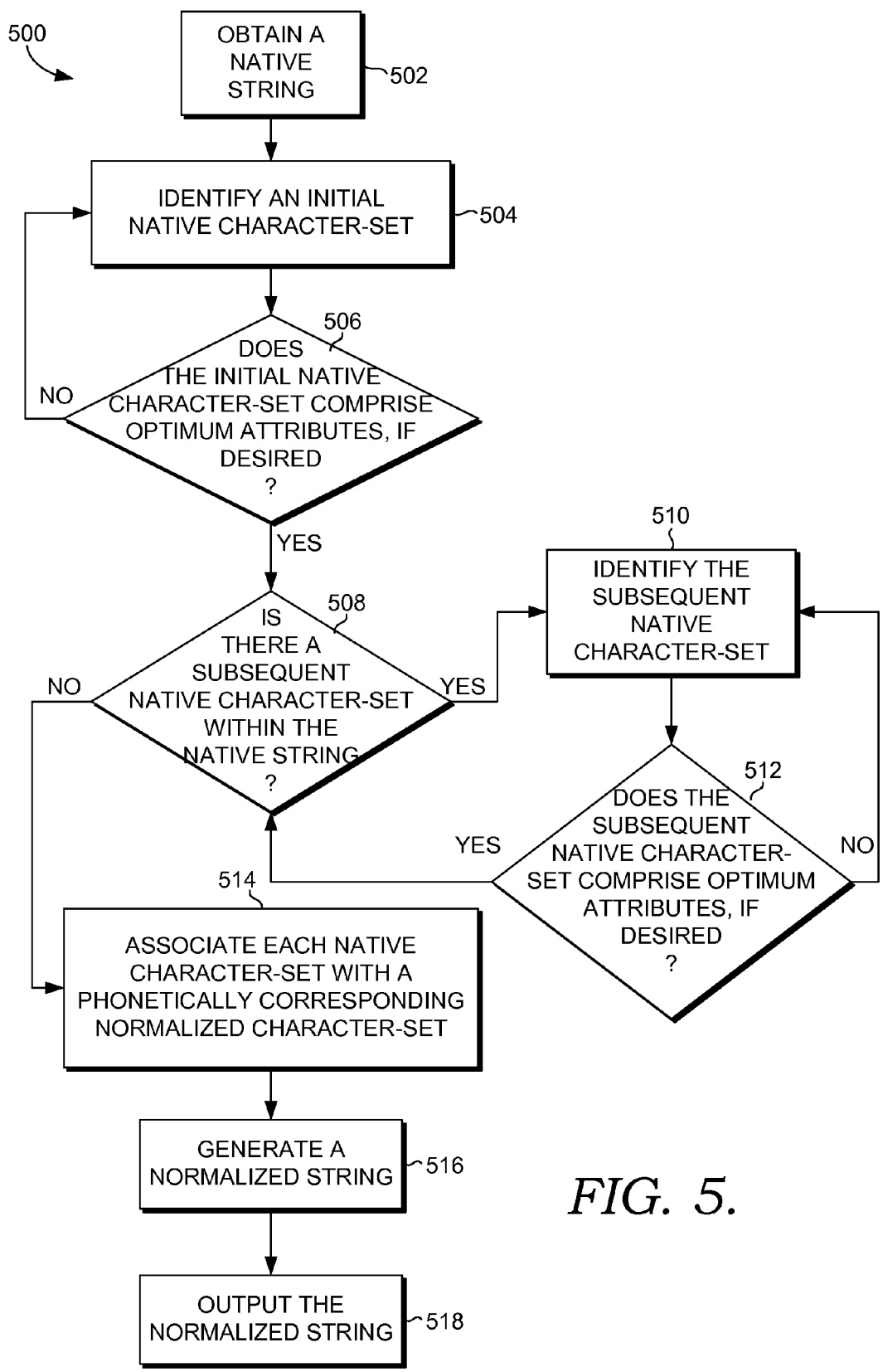
FIG. 5 is a flow diagram for generating a normalized string, according to an embodiment of the present invention.

Turning now to FIG. 5, a flow diagram is shown illustrating a method 500 for generating a normalized string, in accordance with an embodiment of the present invention. Initially, as indicated at block 502, a native string is obtained. Subsequently, an initial native character-set is identified at block 504. Such a native character-set may be based on a writing system, such as the Indian writing system. At block 506, it is determined if the initial native character-set comprises optimum attributes, if desired, e.g., a maximum character-set size. If it is determined that the initial native character-set identified does not comprise the desired optimum attributes, the method returns to block 504 until an initial native character-set comprising the desired optimum attributes is identified.

If, however, it is determined that the initial native character-set comprises the desired optimum attributes, it is determined at block 508 if there is a subsequent native character-set within the native string. If there is a subsequent native character-set within the native string, the subsequent native character-set is identified at block 510. Upon identifying the subsequent native character-set, it is determined, at block 512, if the subsequent native character-set comprises optimum attributes, if desired. If it is determined that the subsequent native character-set does not comprise the desired optimum attributes, the method returns to block 510 until the subsequent character-set comprising the desired optimum attributes is identified. If, however, it is determined that the subsequent native character-set comprises the desired optimum attributes, the method continues to block 508 to determine if there is a further subsequent native character-sets within the character string.

Referring to block 508, if it is determined that a subsequent native character-set within the native string does not exist, each native character-set identified at block 504 and block 510, if any, is associated with a phonetically corresponding normalized character-set at block 514. Such a corresponding normalized character-set may be based on a second writing system, e.g., English. Subsequently, at block 516, a normalized string is generated based on the phonetically corresponding normalized character-set. The normalized string is output at block 518.

It will be understood by those of ordinary skill in the art that method 500 of FIG. 5 is exemplary in nature and number and should not be construed as limited. One skilled in the art will recognize that other embodiments for generating a normalized string may exist. For example, optimum attributes associated with blocks 506 and 512 may not be utilized to generate a normalized string. In addition, generating a normalized string may comprise identifying each native character-set and associating the native character set with a normalized character-set prior to identifying a subsequent native character-set.

Figure 6:
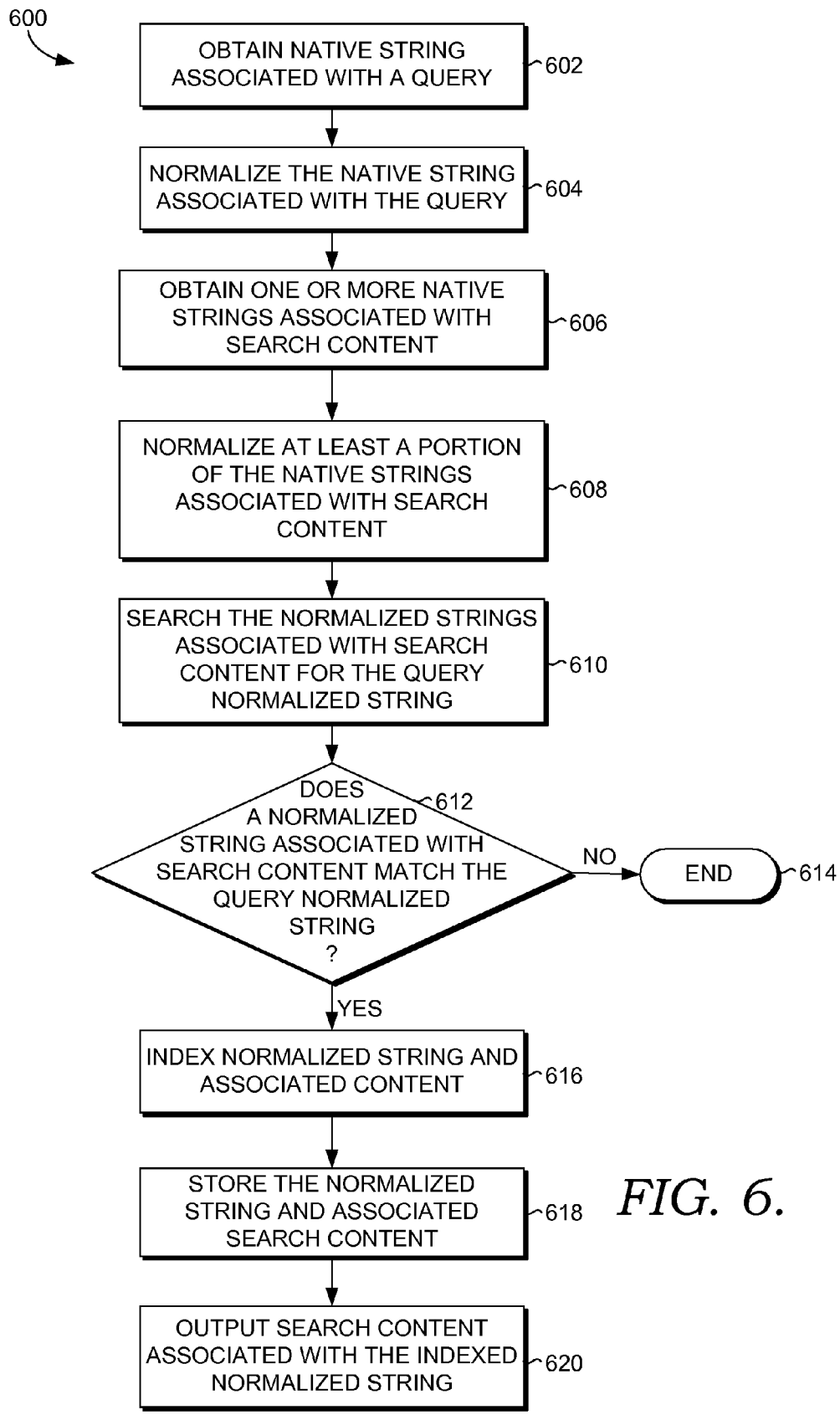
FIG. 6 is a flow diagram for performing a phonetic search, according to an embodiment of the present invention.

With reference to FIG. 6, a flow diagram is shown illustrating a method 600 for performing a phonetic search, in accordance with an embodiment of the present invention. Initially, as indicated at block 602, a native string associated with a query is obtained. The native string associated with the query is normalized at block 604. At block 606, one or more native strings associated with search content is obtained. Thereafter, at least a portion of the native strings associated with the search content is normalized at block 608. At block 610, the normalized strings associated with search content are searched for the query normalized string. Subsequently, at block 612, it is determined if any normalized string associated with search content matches the query normalized string. If no normalized strings associated with search content match the query normalized string, the method ends at block 614. If, however, at least one normalized string associated with search content matches the query normalized string, the normalized string and associated search content, or an identification thereof, are indexed at block 616. At block 618, the normalized string and associated search content, or an identification thereof, are stored. At block 620, the normalized string and/or associated search content are output.

Figure 7:
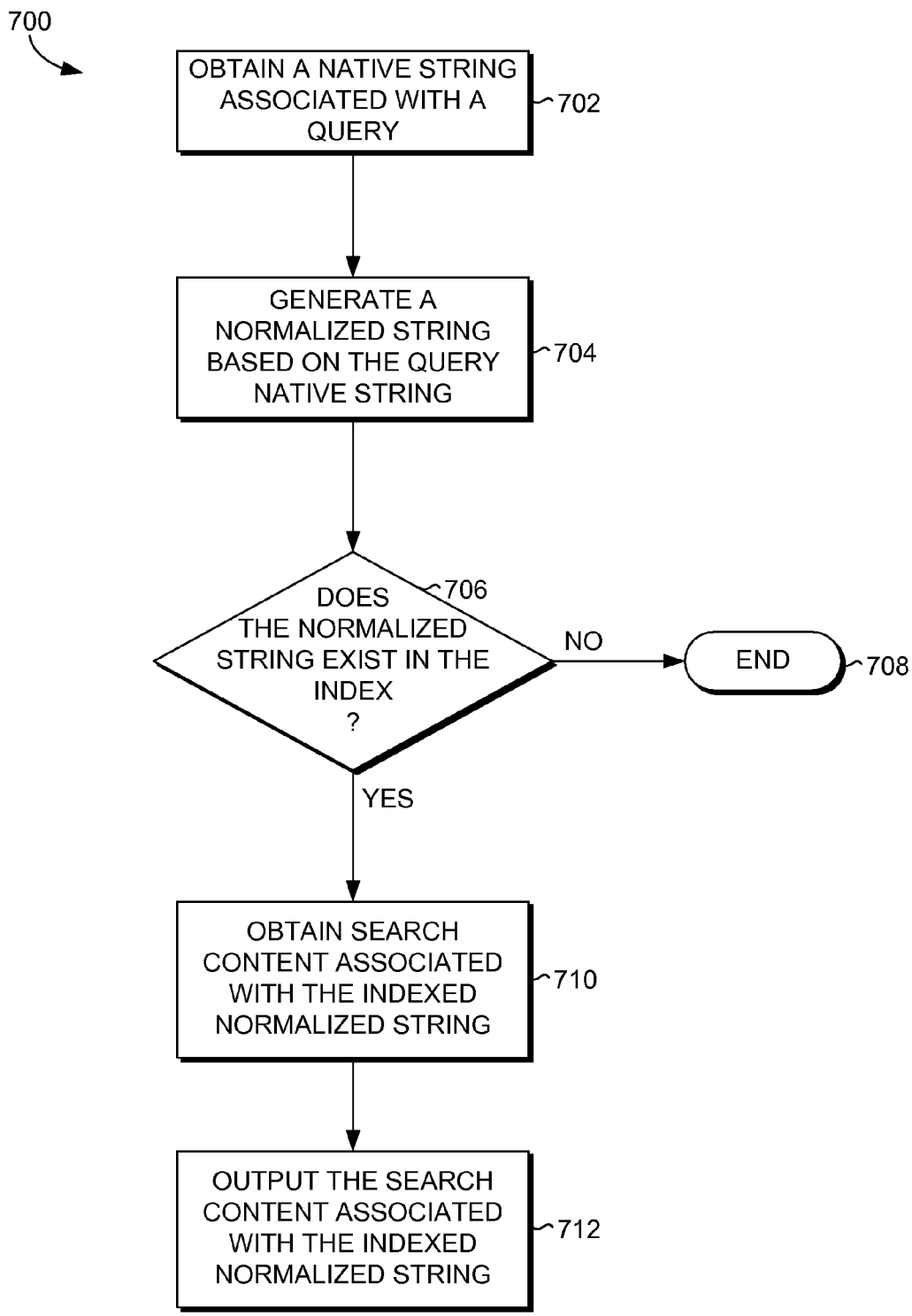
FIG. 7 is a flow diagram for utilizing an index to obtain search content associated with a string, according to an embodiment of the present invention.

Turning now to FIG. 7, a flow diagram illustrates a method 700 for utilizing an index to obtain search content associated with a string, in accordance with an embodiment of the present invention. Initially, as indicated at block 702, a native string associated with a query is obtained. Subsequently, at block 704, a normalized string based on the query native string is generated. At block 706, it is determined if the normalized string exists in the index. If it is determined that the normalized string does not exist within the index, the method ends at block 708. If, however, it is determined that the normalized string does exist within the index, the search content associated with the indexed normalized string is obtained at block 710. Thereafter, the search content associated with the indexed normalized string is output at block 712.

Although the present invention has been described with reference to particular embodiments, workers skilled in the art will recognize that changes may be made in form and detail without departing from the spirit and scope of the invention. Embodiments of the present invention have been described with the intent to be illustrative rather than restrictive. It will be understood that certain features and subcombinations are of utility and may be employed without reference to other features and subcombinations and are contemplated within the scope of the claims. Not all steps listed in the various figures need be carried out in the specific order described.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

The invention claimed is:

1. One or more computer-storage devices having computer-executable instructions embodied thereon that, when executed, perform a method for generating a normalized string based on a native string, wherein the native string comprises one or more native character-sets associated with an Indian writing system, the method comprising:
   identifying one or more native character-sets within the native string using an optimization attribute that takes into account size of the one or more character-sets being analyzed, wherein one of the one or more native character-sets comprises an initial native character-set having a greatest number of characters, including at least the first character of the native string, that matches a first predetermined native character-set, and each of the one or more native character-sets subsequent to the initial native character-set, if any, comprises the greatest number of characters, including at least the first character following a previous native character-set, that matches a corresponding predetermined native character-set;
   associating each of the one or more native character-sets with one or more phonetically corresponding normalized character-sets based on an English writing system;
   generating a query normalized string, wherein the query normalized string comprises the one or more phonetically corresponding normalized character-sets based on the English writing system; and
   utilizing the query normalized string to identify search content related to the native string input by a user, wherein search content related to the native string input by the user is identified based on the query normalized string matching at least one normalized string associated with the search content.

2. The computer-storage media of claim 1 further comprising obtaining the native string.

3. The computer-storage media of claim 1 further comprising outputting the normalized string.

4. The computer-storage media of claim 1, wherein generating a normalized string comprises substituting each of the one or more native character-sets within the native string with the one or more phonetically corresponding normalized character-sets.

5. The computer-storage media of claim 1, wherein identifying the one or more native character-sets within the native string comprises identifying the one or more native character-sets based on an optimized attribute.

6. The computer-storage media of claim 5, wherein the optimized attribute comprises the largest character set size.

7. The computer-storage media of claim 1, wherein generating the normalized string comprises utilizing a restatement chart.

8. The computer-storage media of claim 7, wherein the restatement chart comprises a data structure comprising:
    a first group of one or more native character-sets based on an Indian writing system; and
    a second group of one or more normalized character-sets based on an English writing system,
    wherein each of the one or more native character-sets phonetically corresponds with one of the one or more normalized character-sets.

9. The computer-storage media of claim 7 further comprising a third group of one or more rules, wherein each of the one or more rules corresponds with one of the one or more native character-sets, one of the one or more normalized character-set, or a combination thereof.

10. One or more computer-storage devices having computer-executable instructions embodied thereon that, when executed, perform a method for performing a phonetic search, the method comprising:
    obtaining a query native string associated with a query based on an Indian writing system;
    obtaining one or more search content native strings associated with search content to be searched;
    generating a query normalized string based on the query native string input by a user using an optimization attribute that takes into account size of one or more character-sets within the query native string, the query normalized string being generated based on one or more largest character-set sizes that correspond with phonetic correlations to the query native string input by the user;
    generating one or more search content normalized strings based on each of the one or more search content native strings associated with search content to be searched, the one or more search content normalized strings being generated in accordance with phonetic correlations to the one or more search content native strings;
    determining if the query normalized string generated in accordance with phonetic correlations to the query native string input by the user matches any of the one or more search content normalized strings generated in accordance with phonetic correlations to the one or more search content native strings; and
    if so, indexing the query normalized string in association with the search content having the one or more search content normalized strings that match the query normalized string such that the index may be accessed at a later time.

11. The computer-storage device of claim 10 further comprising indexing the search content associated with the one or more search content normalized strings that match the query normalized string.

12. The computer-storage device of claim 10 further comprising outputting the one or more search content normalized strings that match the query normalized string, the search content associated with the one or more search content normalized strings that match the query normalized string, or a combination thereof.

13. The computer-storage device of claim 10, wherein determining if the query normalized string matches any of the one or more search content normalized strings comprises a one-to-one comparison.

14. The computer-storage device of claim 10, wherein generating the query normalized string comprises replacing at least one native character-set with at least one normalized character-set.

15. A system for performing a phonetic search, the system comprising:
    one or more processors;
    one or more computer-storage media storing:
        (1) a restatement module, executable by the one or more processors, configured to generate a query normalized string associated with a query based on an Indian writing system and to generate one or more search content normalized strings based on one or more search content native strings associated with search content to be searched, each of the one or more search content normalized strings being generated by:
            a) identifying a first character-set within the search content native string that has a first largest number of characters that match one of a plurality of predetermined native character-sets, the first character-set including at least a first character of the search content native string,
            b) identifying a second character-set within the search content native string that has a second largest number of characters that match one of the plurality of predetermined native character-sets, the second character-set being subsequent to the first character-set and including at least a first character following the first character-set, and
            c) substituting the first character-set and the second character-set with a phonetically corresponding normalized character-set based on an English writing system;
        (2) an execution module, executable by the one or more processors, configured to determine if the query normalized string matches any of the one or more search content normalized strings;
        (3) an index module, executable by the one or more processors, configured to index the one or more search content normalized strings that match the query normalized string and correlate each of the one or more search content normalized strings that match the query normalized string with the associated search content; and
        (4) a restoration module, executable by the one or more processors, configured to utilize the indexed one or more search content normalized strings to obtain the search content associated with the one or more search content normalized strings upon generating a second query normalized string that matches the query normalized string.

16. The system of claim 15, further comprising an input module configured to obtain data associated with a search.

17. The system of claim 15, further comprising an output module configured to output one or more search content normalized strings, search content associated with the one or more search content normalized strings, or a combination thereof.

18. The system of claim 15, wherein the query normalized string is based on a query native string and the one or more search content normalized strings are based on one or more search content native strings.

19. The system of claim 18, wherein the query native string and the search content native strings are based on an Indian writing system.

20. The system of claim 18, wherein the query normalized string and the search content normalized strings are based on an English writing system.

* * * * *